(12) United States Patent
Tsukamoto et al.

(10) Patent No.: US 6,397,578 B2
(45) Date of Patent: Jun. 4, 2002

(54) GAS TURBINE POWER PLANT

(75) Inventors: Moriaki Tsukamoto, Naka-gun; Yoshiki Noguchi; Shigeo Hatamiya, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/842,733

(22) Filed: Apr. 27, 2001

Related U.S. Application Data

(63) Continuation of application No. 09/313,213, filed on May 18, 1999, now Pat. No. 6,247,302.

(30) Foreign Application Priority Data

May 20, 1998 (JP) ............................................. 10-137960

(51) Int. Cl.$^7$ ................................................. F02C 7/10
(52) U.S. Cl. ..................... 60/39.511; 60/728; 60/39.53; 60/39.05
(58) Field of Search ................. 60/728, 39.53, 60/39.05, 39.511

(56) References Cited

U.S. PATENT DOCUMENTS

| | | | |
|---|---|---|---|
| 4,702,074 A | 10/1987 | Munk | |
| 4,829,763 A | 5/1989 | Rao | |
| 5,193,337 A | 3/1993 | Harboe et al. | |
| 5,271,215 A | 12/1993 | Guillet | |
| 5,379,589 A | 1/1995 | Cohn | |
| 5,622,044 A | 4/1997 | Bronicki et al. | |
| 5,797,259 A | 8/1998 | Nielsen et al. | |
| 6,247,302 B1 * | 6/2001 | Tsukamoto et al. | 60/39.511 |

FOREIGN PATENT DOCUMENTS

| | | |
|---|---|---|
| EP | 0 275 121 | 7/1988 |
| EP | 0718472 A1 | 6/1996 |
| EP | 821 136 | 1/1998 |
| EP | 821 137 | 12/1998 |
| EP | 0123456 A2 | 1/2000 |
| JP | 1-19053 | 4/1989 |
| JP | 1-31012 | 6/1989 |
| JP | 6-248974 | 9/1994 |
| JP | 9-264158 | 10/1997 |
| JP | 10-103080 | 4/1998 |
| JP | 10-110628 | 4/1998 |
| WO | WO9801658 | 1/1998 |

OTHER PUBLICATIONS

ASME Paper 93–JPGC–GT–6, "Union Electric Company's Combustion Turbine Inlet Air Cooling Study", C. Henderson et al.*
ASME Paper 95–GT–311, "Benefits Of Compressor Inlet Air Cooling For Gas Turbine Cogeneration Plants", C. De Lucia et al.*
Journal of Engineering for Gas Turbines and Power, vol. 117, Jul. 1995, P. Chiesa et al, pp. 499–508.
ASME Paper 96–GT–361, "Revap Cycle: A New Evaporative Cycle Without Saturation Tower", J. DeRuyek et al.
ASME Paper 95–CTP–39, "Humid Air Cycle Development Based on Energy Analysis and Composite Curve Theory", J. DeRuyek et al.

* cited by examiner

*Primary Examiner*—Charles G. Freay
*Assistant Examiner*—William H Rodriguez
(74) *Attorney, Agent, or Firm*—Mattingly, Stanger & Malur, P.C.

(57) ABSTRACT

A gas turbine power plant has no intercooler for compressed air and comprises a compressor, a combustor for burning fuel with compressed air from the compressor to produce combustion gas, a turbine driven by the combustion gas, a generator driven by the turbine to generate electric power, a regenerative heat exchanger which heats the compressed air with the heat of exhaust gas of the turbine and has a water spray arranged therein for spraying water droplets onto the compressed air therein, and a spray device directly communicating with the compressor for spraying water onto compressed air of high temperature from the compressor to humidify the compressed air, the compressed air being led to the regenerative heat exchanger.

3 Claims, 7 Drawing Sheets

GAS TURBINE POWER PLANT

This is a continuation application of U.S. Ser. No. 09/313,213, filed May. 18, 1999, now U.S. Pat. No. 6,247,302.

BACKGROUND OF THE INVENTION

The present invention relates to a gas turbine power plant which is provided with a turbine driven by combustion gas of a large moisture content and a heat recovery system for recovering the heat of turbine exhaust gas and, more particularly, to a gas turbine power plant which comprises a compressor not employing any intercooler for compressed air, a combustor burning fuel with compressed air, a turbine driven by combustion gas of a high moisture content and a heat recovery system for recovering the heat of turbine exhaust gas, in which the moisture content of combustion gas is increased by increasing a quantity of water or steam contained in air compressed by a compressor to be supplied into the combustor.

Conventional gas turbine power plants using humidified air are disclosed in many publications. For example, JP B 1-31012 and JP A 9-2641582 each disclose a gas turbine cycle in which air compressed by a compressor and liquid phase water used as a heat recovery medium and heated are contacted each other in a exchanging tower, thereby to obtain humidified air or an air/steam mixture and cooled liquid phase water, and the humidified air recovers the heat of turbine exhaust gas while the cooled liquid phase water serves as a heat recovery medium to recover the heat of turbine exhaust gas and intercool the compressor, wherein the liquid phase water of a quantity corresponding to a quantity transferred to the compressed air as steam is used as a cooling medium downstream of the intercooler of the compressor cooled by the cooled liquid phase water obtained in the exchanging tower or humidification tower, and makes up the liquid phase water used in the exchanging tower and served for heat recovery.

JP B 1-19053 discloses a gas turbine system which effects heat recovery of turbine exhaust gas or the turbine exhaust gas heat recovery and intercooling of a compressor with humidified air or compressed air/water/steam mixture, obtained by injection of liquid phase water into the compressed air at a compressor outlet, without using such an exchanging tower or humidification tower as disclosed in the JP B 1-31012 and JP A 9-264158, and cools beforehand the compressed air used for forming the above-mentioned humidified air with a part of the humidified air.

Further, "J. of Eng. for Gas Turbine and Power, vol. 117, pp 499–508 (1995)" by P. Chiesa, et al. and ASME Paper 96-GT-361 "Revap Cycle: A New Evaporative Cycle Without Saturation Tower" by J. De Ruyck, et al. also disclose a gas turbine system not using a humidification tower as disclosed in JP A-1-19053.

However, the above-mentioned conventional techniques do not consider to further increase a quantity of water or steam contained in the air heated by the heat of exhaust gas from the gas turbine.

Namely, an upper limit of a water quantity that humidified air can contain, that is, a water quantity (hereunder, refer to as saturated water quantity) that saturated air contains depends on temperature, and the higher the temperature of the humidified air, the more the saturated water quantity. Therefore, even for the air humidified until it becomes a saturated condition (a relative humidity $\psi$, which denotes a partial pressure of steam in the humidified air to a saturated pressure of steam corresponding to temperature of the humidified air, =1) at an inlet of a heat recovery apparatus, the relative humidity becomes low by being heated in the heat recovery apparatus and having raised in temperature. That is, for the humidified air which has been raised in temperature in the heat recovery apparatus, it is possible to further contain therein steam until it reaches to a saturated condition.

Further, there are many other prior art references, examples of which are as follows:

WO 98/01658 discloses method and device for generation of mechanical work and heat in an evaporative gas turbine process in which all or part of compressed air is humidified and cooled and then led to a heat recovery apparatus, but no water is injected onto the compressed air inside the heat recovery apparatus.

EP 821136 A1 and EP 821137 A1 each disclose a system for power generation in which water cooling means is provided on a compressor or at an upstream side of the compressor to inject water into air being compressed or before compression to cool the air. In the system, a water injection device is not provided on heat recovery apparatus.

JP A 6-248974 discloses a partially regenerative type two fluid gas turbine which is provided with a mixer for mixing compressed air and steam to humidify the compressed air, but not provided with a water or steam injection device in a heat exchanger for heat-exchanging a turbine exhaust gas and the compressed air from the mixer.

JP A 10-103080 discloses a gas turbine cycle in which water is sprayed onto air being compressed to cool the compressed air, but the compressed air is not humidified in a recovery unit.

EP 0718472 A1 discloses a power process utilizing humidified combustion air to a gas turbine in which a saturator tower is provided for humidify compressed air and the humidified air is transferred to a heat recovery unit without any water injector and, alternatively, compressed air from a high pressure compressor is transferred to a heat recovery unit with a spray nozzle and water is injected onto the compressed air only in the heat recovery unit.

ASME Paper 95-CTP-39 "Humid Air Cycle Development Based on Exergy Analysis and Composite Curve Theory" by J. De Ruyck, et al. disclose a gas turbine cycle, where heat exchange or heat recovery is effected at an intercooler, an aftercooler and a heat recovery system of high temperature exhaust gas. Compressed air from a high pressure compressor is cooled in the aftercooler by a cooling medium flowing in a conduit inside the aftercooler. The cooling medium is a part of the compressed air from the high pressure compressor, which is humidified and cooled by injection of feedwater into the conduit of the aftercooler. The part of compressed air is transferred to the heat recovery system after being supplied with feedwater and heated by the compressed water in the aftercooler. The other part of the compressed air is transferred from the aftercooler to the heat recovery system without feedwater supply before entering the heat recovery system and supplied with feedwater inside the heat recovery system.

In this system, there is room for improvement on temperature lowering of the compressed air before entering the heat recovery system.

SUMMARY OF THE INVENTION

An object of the present invention is to provide a gas turbine power plant in which the power generation efficiency is improved by increasing a flow rate of a turbine working medium such as combustion gas by sufficiently increasing the water content of the air to be supplied to a combustor, and increasing a heat quantity recovered from exhaust gas of the gas turbine.

Another object of the present invention is to provide a gas turbine power plant which has no intercooler for compressed air and less complicated structural parts and which is improved in power generation efficiency by increasing a flow rate of a turbine working medium such as combustion gas by supply of air of increased water content to a combustor, and increasing a heat quantity recovered from exhaust gas of the gas turbine.

The objects are attained by a gas turbine power plant according to the present invention, which has no intercooler for compressed air and comprises a compressor, a combustor for burning fuel with compressed air from the compressor to produce combustion gas, a turbine driven by the combustion gas, a generator driven by the turbine to generate electric power, a regenerative heat exchanger which heats the compressed air with the heat of exhaust gas of the turbine and has a water spray arranged therein for spraying water droplets onto the compressed air therein, and a spray device directly communicating with the compressor for spraying water onto compressed air of high temperature from the compressor to humidify the compressed air, the compressed air being led to the regenerative heat exchanger.

The gas turbine power plant is provided with a feedwater heater downstream of the regenerative heat exchanger with respect to a flow of exhaust gas from the turbine, and the above-mentioned water spray and spray device each are supplied with feedwater heated by the feedwater heater.

Further, the present invention resides in a gas turbine power plant which comprises a compressor for compressing air to discharge compressed air, a combustor for burning fuel with the compressed air to produce combustion gas, a turbine driven by the combustion gas, a generator driven by the turbine to generate electric power, a regenerative heat exchanger for heating compressed air to be supplied to the combustor with the heat of exhaust gas of the turbine, the regenerative heat exchanger having a water spray arranged therein for spraying water droplets onto the compressed air therein, a first flow line of a part of compressed air from the compressor, leading to the regenerative heat exchanger, a heat exchanger arranged on the first flow line for lowering temperature of the compressed air in the first flow line, a first spray device arranged on the first flow line downstream of the heat exchanger and upstream of the regenerative heat exchanger, a second flow line of another part of compressed air from the compressor, fluidly communicating with the heat exchanger, a second spray device arranged on the second flow line for spraying water onto the compressed air flowing in the second flow line and humidifying the compressed air to turn it to humidified air lowered in temperature, the humidified air being heat-exchanged with the compressed air from the first flow line in the heat exchanger.

In this gas turbine power plant, preferably, flow rates of compressed air in the first and second flow lines are substantially same as each other This gas turbine power plant is provided with a third spray device on the second flow line downstream of the heat exchanger, and the humidified air by the third spray device is led to the regenerative heat exchanger.

Further, this gas turbine power plant is provided with a feedwater heater downstream of the regenerative heat exchanger with respect to a flow of exhaust gas from the turbine, and the above-mentioned water spray and first, second and third spray devices each are supplied with feedwater heated by the feedwater heater.

DESCRIPTION OF EMBODIMENTS OF THE INVENTION

Figure 1:
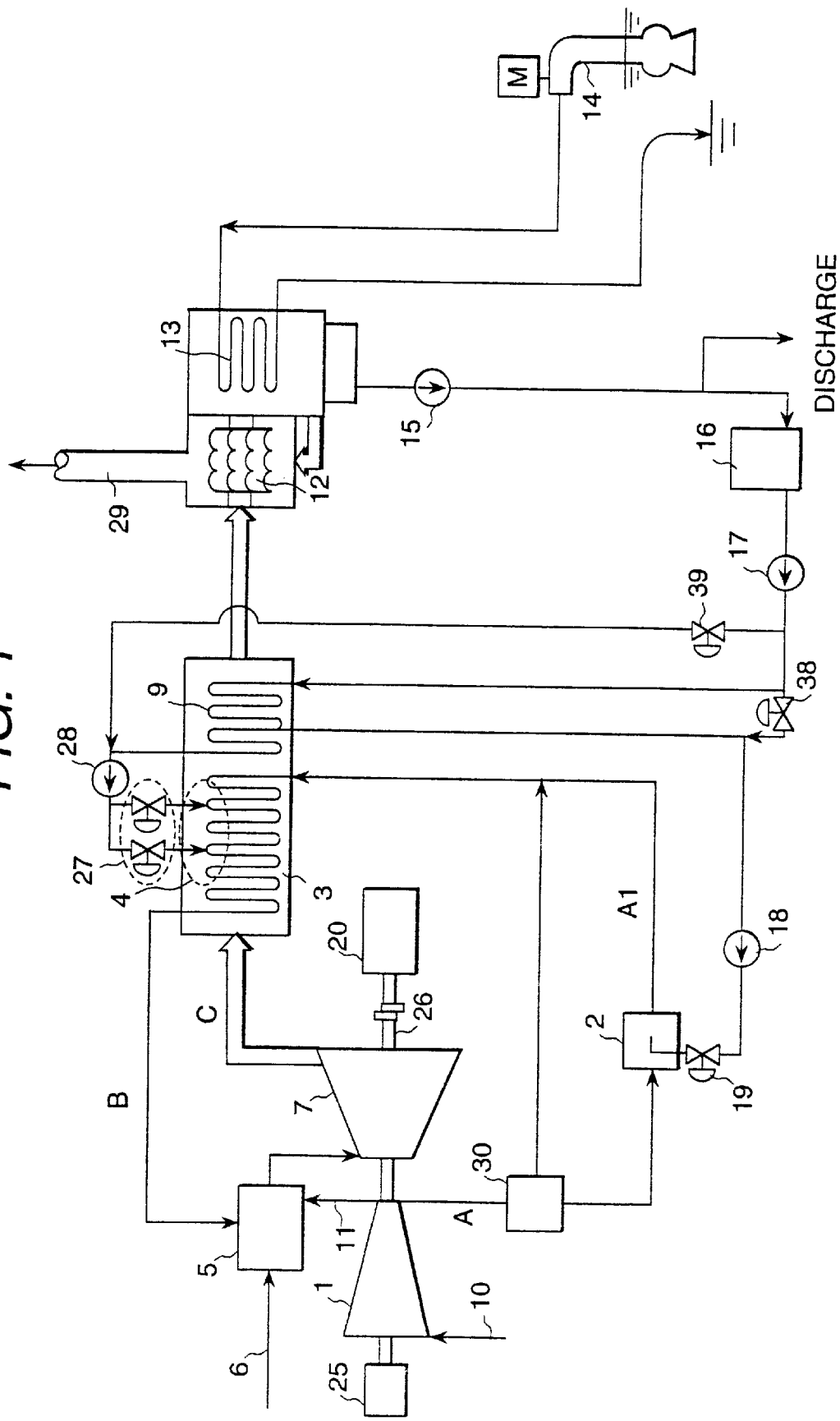
FIG. 1 is a schematic diagram of a mechanical system showing a gas turbine power plant of a first embodiment of the present invention.

Embodiments of the present invention will be described hereunder, referring to the drawings.

First of all, an embodiment (first embodiment) will be described, referring to FIGS. 1 to 4.

In FIG. 1 showing a mechanical system of a gas turbine power plant of the first embodiment, A1, B each denote humidified air containing water of a desired quantity or more or a relative humidity of a desired value or more, 1 denotes a compressor for compressing air such as atmospheric air or gas (hereunder, referred to simply as air) that air or oxygen is main, 2 denotes a spray device for injecting or spraying a cooling medium such as water or steam onto compressed air, 3 denotes a regenerative heat exchanger for recovering the heat of exhaust gas exhausted from a turbine, 4 denotes a spray device composed of, for example, a spray nozzle or nozzles or the like for injecting or spraying the cooling medium in the humidified air, 5 denotes a combustor for mixing and burning fuel and the humidified air to produce combustion gas, 6 denotes fuel such as natural gas that liquified natural gas is gasifyed, 7 denotes a turbine operated with the combustion gas, C denotes exhaust gas exhausted from the turbine, 9 denotes a feedwater heater heating feedwater by using the heat of exhaust gas exhausted from the turbine, 10 denotes air or the like, A denotes compressed air compressed by the compressor, 12 denotes a gas/gas heat exchanger for heat-exchanging the exhaust gas exhausted from the feedwater heater and the exhaust gas from which humidity thereof is removed at a water recovery unit, 13 denotes the water recovery unit for removing humidity in the exhaust gas, 14 denotes a sea water pump for pumping up sea water, 15 denotes a condensate pump for pressurizing recovery water recovered by the water recovery tower, 16 denotes a water treatment unit such as demineralizer for purifying the recovery water, 17 denotes a feedwater pump for pressurizing purified recovery water, 18 denotes a feedwater pump for pressurizing recovery water (hereunder, referred to as feedwater) pressurized by the feedwater pump, 19, 27, 38, 39 each denote a control valve for controlling a flow rate of feedwater, 20 denotes a generator driven by the turbine and generating electric power by converting mechanical energy to electric energy, 25 denotes an electric motor or starter driving the turbine connected to the turbine to rotate the turbine until fuel is supplied to the combustor and the turbine rotates by force of combustion gas, 26 denotes a turbine rotor, 28 denotes a feedwater pump pressurizing feedwater, 29 denotes an exhaust stack exhausting exhaust gas into the atmosphere, 30 denotes a branching device for branching compressed air and changing a branch ratio (distribution of discharge flows of the compressed air).

An operation of the gas turbine power plant according to the present invention will be described hereunder.

The compressor 1 compresses air or the like (if it is atmospheric air, the pressure thereof is about 1 ata) to 15 ata, whereby it is turned compressed air A of relatively high temperature, for example, about 400° C. by adiabatic expansion. On a flow line of the compressed air A between the compressor 1 and the regenerative heat exchanger 3, the spray device 2 is arranged. The spray device 2 sprays fine water droplets on the compressed air A to humidify the compressed air A1 and cool it mainly with evaporation latent heat of the fine water droplets, whereby humidified air A1 of relatively low temperature, for example, about 130° C. is obtained. That is, in the spray device 2, the compressed air A and the fine water droplets are directly contacted, thereby to humidify and cool the compressed air A1 and increase a flow rate thereof. On the basis of a temperature, pressure, water quantity (or absolute humidity or relative humidity) taken as a control indication, a spray quantity of fine water droplets, that is, a flow rate of feedwater supplied to the spray device 2 is controlled by the control valve 19 so that all the sprayed fine water droplets evaporate and the temperature of humidified air A1 is sufficiently lowered to a desired temperature. In order to avoid damage of piping forming a flow line for the humidified air A1, it is preferable for the humidified air A1 that the relative humidity ψ is a little less than in a saturated air condition (relative humidity ψ=1). A quantity of fine water droplets sprayed by the spray device 2 is about 11% by weight of the air 10 to b sucked into the compressor 1, for example. Further, as a cooling medium for cooling the compressed air A by the spray device 2, steam of lower temperature, preferably, saturated steam than the compressed air A is sufficient, but liquid phase water is preferred to because it has a high cooling effect and it is easy to raise the pressure and to control a flow rate thereof.

Further, on the flow line for the compressed air A between the compressor 1 and the spray device 2, the branch device 30 is arranged, and a bypass line is arranged, which bypasses the spray device 2 and leads the compressed air A to the regenerative heat exchanger 3. The branch device 30 changes a share of a flow rate of compressed air A to be introduced into the spray device 2 or a flow rate of the compressed air A to be bypassed the spray device 2, whereby the temperature or/and water quantity of the humidified air A1 at the inlet of the regenerative heat exchanger 3 can be controlled.

The regenerative heat exchanger 3 which is of type of counter flow and indirect heat exchange, for example, multi tube type, fin tube type, blade fin type, blade type, etc. is arranged at a downstream side of the turbine 7 and at an upstream side of the exhaust stack with respect to a flow of the exhaust gas C. A part or all of the humidified air A1 is introduced into the regenerative heat exchanger 3 and recovers the heat of the exhaust gas C which has a temperature of about 600° C. or more at the outlet side of the turbine 7. That is, in the regenerative heat exchanger 3, the humidified air A1 exchanges heat thereof with the exhaust gas C and is heated by the heat of the exhaust gas C to raise the temperature. The regenerative heat exchanger 3 has the spray nozzle 4 arranged at least one position of the flow line for the humidified air A1 in the inside thereof, for example, inside the flow line in a heat conducting tube. The spray nozzle 4 sprays further fine water droplets onto the humidified air A1 to obtain humidified air B of about 580° C., for example. And a spray quantity of the fine water droplets, that is, a flow rate of feedwater to be supplied to the spray nozzle 4 is controlled by the control valve 27, on the basis of one or both of the temperature, pressure of the humidified air B at the inlet of the combustor 5 and a temperature difference between the exhaust gas 8 flowing in the flow line to the regenerative heat exchanger 3 and the humidified air B. A quantity of fine water droplets sprayed by the spray nozzle 4 is about 5% by weight of the air 10 introduced into the compressor 1. Further, a cooling medium for cooling the humidified air A1 by the spray nozzle 4 can be steam, preferably, saturated steam of a temperature lower than the humidified air A1, however, preferably it is liquid phase water that a cooling effect is high because it receives latent heat during evaporation and it is easy to raise the pressure and to control a flow rate thereof.

The humidified air B is used as a combustion support gas in the combustor 5, a working medium gas for the turbine 7, etc. That is, the humidified air B is introduced into the combustor 5 and mixed with fuel 6 in the combustor 5, and the mixture is burnt to produce combustion gas, which is a working medium for the turbine 7, of a temperature of 1200° C. or higher. The combustion gas is introduced into the turbine 7 to drive it. The turbine 7 is connected to the generator 20 by the turbine rotor 26 to rotate the generator 20, thereby to generate electric power. The turbine rotor 26 is connected to the compressor 1 to drive it, thereby to compress air 10 or the like. Further, since combustion in the combustor 5 becomes unstable at a time of starting of the plant or during operation at a low load, it is preferable that the compressed air A is directly introduced into the combustor to reduce the relative humidity of combustion air.

The feedwater heater 9 of counter flow and indirect heat exchange type is arranged at a downstream side of the regenerative heat exchanger 3 with respect to the flow of exhaust gas C. Water to be supplied to the spray device 2 and spray nozzle 4 is preheated by the heat of exhaust gas C in the feedwater heater 9, and then the water is supplied to each of the spray device and supply nozzle. Thereby, the remaining of the heat of exhaust gas C recovered by the regenerative heat exchanger 3 can be recovered, whereby the thermal efficiency of the plant can be improved. At this time, it is unnecessary to make the temperature of the spray device 2 equal to that of the spray nozzle 4. In the first embodiment, "the temperature of supply water to the spray deice 2"<"the temperature of supply water to the spray nozzle 4", for example, the temperature of supply water to the spray device 2 is about 70° C. and that to the spray nozzle 4 is about 100° C.

The temperature of exhaust gas C, after the heat thereof is recovered by the regenerative heat exchanger 3 and the feedwater heater 9, becomes about 100 to 110° C. at the outlet of the feedwater heater 9, and then the exhaust gas C is led to the gas/gas heat exchanger 12. In the gas/gas heat exchanger 12, the exhaust gas exhausted from the feedwater heater 9 and the exhaust gas C exhausted from the water recovery unit 13 are heat-exchanged, whereby the exhaust gas from the feedwater heater 9 is cooled and the exhaust gas from the water recovery unit 13 is heated. That is, the exhaust gas C exhausted from the feedwater heater 9 is introduced into the water recovery unit 13 after precooled at the gas/gas heat exchanger 12. In the water recovery unit 13 of indirect heat exchange type, the exhaust gas is cooled with a cooling medium such as low temperature air, sea water, etc. to about 30–40° C. to condense and recover the water contained in the exhaust gas C. Further, the water recovery unit 13 can be of a direct heat exchange type in which cooling water is directly contacted with the exhaust gas C to cool it. In this case, it is possible that a part or all of the water recovered by the water recovery unit 13 is raised in pressure by a pump and heat-exchanged with the cooling medium to be cooled, and then the cooled water is recirculated as cooling water to the water recovery unit 13.

The recovery water recovered by the water recovery unit 13 is raised in pressure by the condensate pump 15 and purified by the water treatment unit 16, and then it is further raised in pressure by the feedwater pump 17. The feedwater raised in pressure is led to the feedwater heater 9, preheated there and supplied to the spray device 2 and spray nozzle 4. In this manner, because of recirculation of the water inside the plant, water discharged into the atmosphere is minimized and new water is almost not made up from the outside of the plant.

Alternatively, it is possible to supply the feedwater of low temperature obtained by raising the pressure by the feed pump 17 to the spray device 2, by causing it to bypass the feedwater heater 9. That is, the feedwater of high temperature heated by the feedwater heater 9 and the feedwater of low temperature bypassed the feedwater heater 9 are joined and then supplied to the spray device 2. A flow rate of feedwater bypassing the feedwater heater 9 is controlled by the control valve 38 arranged on the bypassing line, and the temperature of the feedwater to be supplied to the spray device 2 is controlled by controlling a share of flow between the feedwater of high temperature heated by the feedwater heater 9 and the feedwater of low temperature bypassed the feedwater heater 9. Thereby, in the case where a load of the plant changes, there is an effect that it is possible to control so as to suppress lowering in heat recovery efficiency.

Further, alternatively, it is possible to cause the feedwater of low temperature obtained by raising pressure by the feedwater pump 17 to bypass the feedwater heater 9 and then supply it to the spray nozzle 4. That is, the feedwater of high temperature heated by the feedwater heater 9 and the feedwater of low temperature bypassed the feedwater heater 9 are joined and then supplied to the spray nozzle 4. A flow rate of feedwater bypassing the feedwater heater 9 is controlled by the control valve 39 arranged on the bypassing line, and the temperature of the feedwater to be supplied to the spray nozzle 4 is controlled by controlling a share of flow between the feedwater of high temperature heated by the feedwater heater 9 and the feedwater of low temperature bypassed the feedwater heater 9. Thereby, in the case where a load of the plant changes, there is an effect that it is possible to control so as to suppress lowering in heat recovery efficiency.

On the other hand, the exhaust gas C from which water has been recovered in the water recovery unit 13 is reheated to about 80–90° C., by the gas/gas heat exchanger 12, and then exhausted into the atmosphere through the stack 29. Reheating the exhaust gas C. cooled through heat exchange with sea water to about 80–90° C. prevents the exhaust gas C exhausted into the atomsphere from causing white smoke. Further, as a cold heat medium for condensing water in the exhaust gas C, it is possible to use the cold heat of liquified natural gas supplied as fuel 6 to the combustor 5 or liquified natural gas supplied to equipment such as another gas turbine plant, iron manufacturing factory, etc., utilizing the liquified natural gas.

Figure 2:
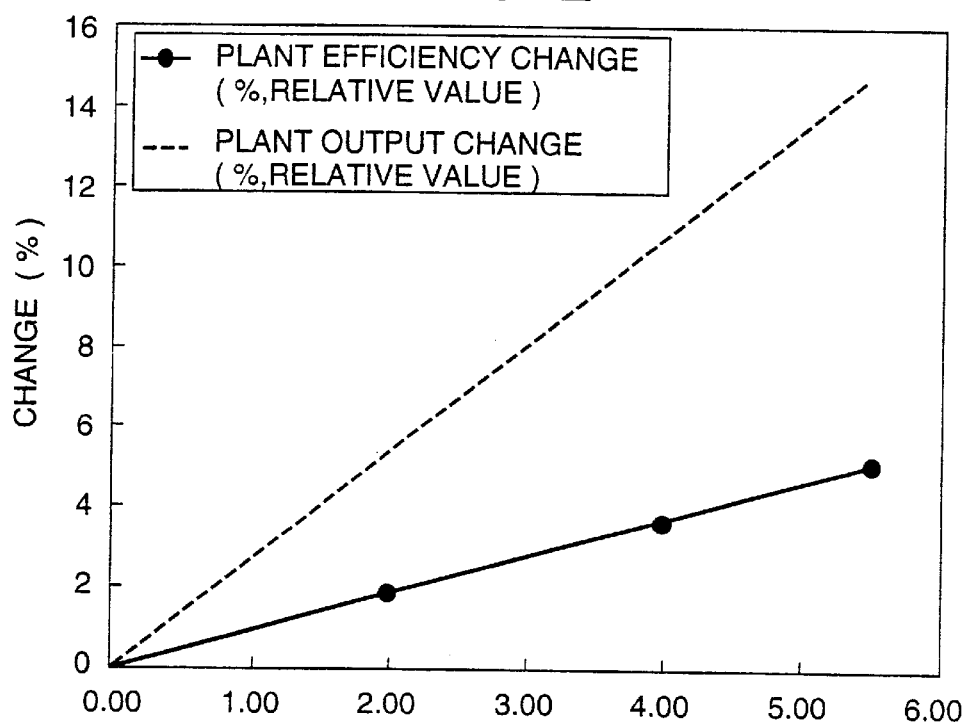
FIG. 2 is a diagram showing relations of plant efficiency and plant output to spray quantities of water in the regenerative heat exchanger in FIG. 1.
Figure 3:
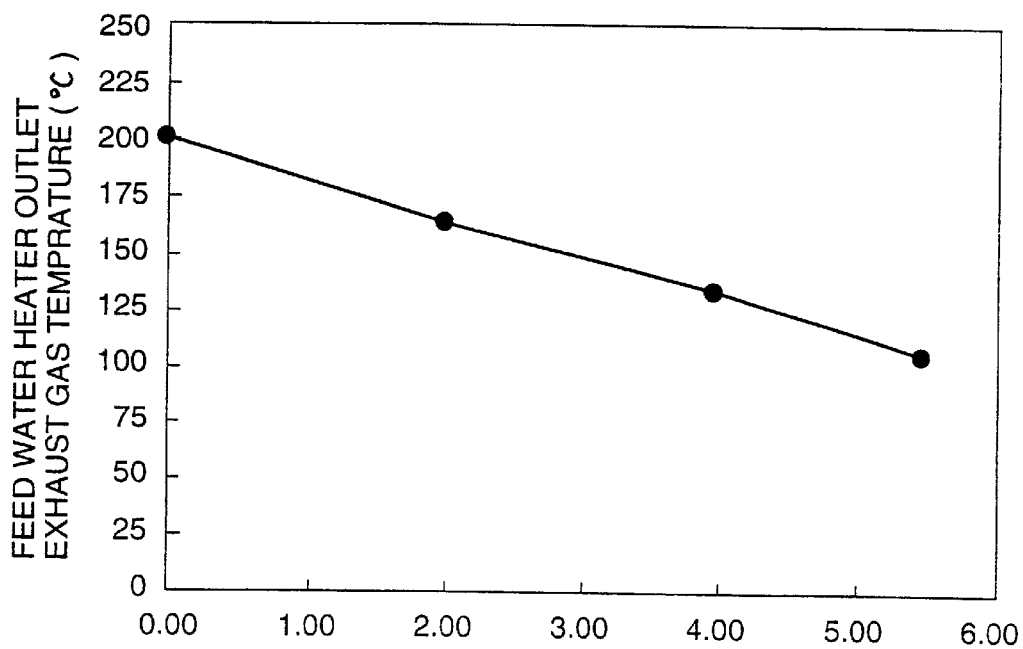
FIG. 3 is a diagram showing a relation of exhaust gas temperature at the feedwater heater outlet to spray quantities of water in the regenerative heat exchanger in FIG. 1.

Next, effects of fine water droplet spraying by the spray nozzle 4 provided in the regenerative heat exchanger 3 are explained, referring to FIG. 2 and FIG. 3.

In FIG. 2, there are shown relations of plant efficiency and plant output to water spray quantities in the regenerative heat exchanger of the gas turbine plant. In FIG. 2, an abscissa is water spray quantities (relative values, by weight %, to an air quantity at the outlet of the compressor) in the regenerative heat exchanger and an ordinate is relative values of changes, that is, increments of plant efficiency and plant output, to values at the time the water spray quantity is zero in the regenerative heat exchanger 3.

FIG. 3 shows a relation of exhaust gas temperatures at the outlet of the feedwater heater 9 to water spray quantities in the regenerative heat exchanger 3 of the gas turbine plant. Further, in FIGS. 2 and 3, the temperature of exhaust gas C, the temperature of humidified air B at the outlet of the regenerative heat exchanger 3, an air quantity at the outlet of the compressor 1 and a water spray quantity of the spray device 2 are set constant.

Further, conditional quantities of each fluid of the gas turbine power plant are shown in table 1.

TABLE 1

|  | Temp. (° C.) | Pressure (kgf/cm$^2$) | Flow rate (kg/s) |
| --- | --- | --- | --- |
| Air 10 | 15 | 1 | 49.5 |
| Compressed air A | 393 | 15 | 49.5 |
| Spray droplet (spray device 2) | 70 | 20 | 5.5 |
| Humidified air A1 | 130 | 14–15 | 55 |
| Spray droplet (spray nozzle 4) | 100 | 20 | 2.7225 |
| Humidified Air B | 580 | 14–15 | 57.7225 |
| Fuel 6 | 15 | — | 1.1 |
| Exhaust gas C (re. heat ex. inlet) | 650 | 1–2 | 59 |
| Exhaust gas C (feed w. heat ex. inlet) | 127 | 1–2 | 59 |
| Exhaust gas C (feed w. heat ex. inlet) | 104 | 1–2 | 59 |

(Note: re., ex. and w. in the table 1 mean regenerative, exchanger and water, respectively.)

From FIG. 2, it is noted that when the water spray quantity in the regenerative heat exchanger 3 is increased from 0 to 5.5% by weight, the plant efficiency is improved by about 5% (relative value) and the plant output is increased by about 15%. At this time, from FIG. 3, it is noted that the temperature of exhaust gas at the outlet of the feedwater outlet is lowered from about 200° C. to about 100° C. This is because increase in the water spray quantity in the regenerative heat exchanger increases both a quantity of recovery heat from the exhaust gas C and a flow rate of the humidified air B.

Figure 4:
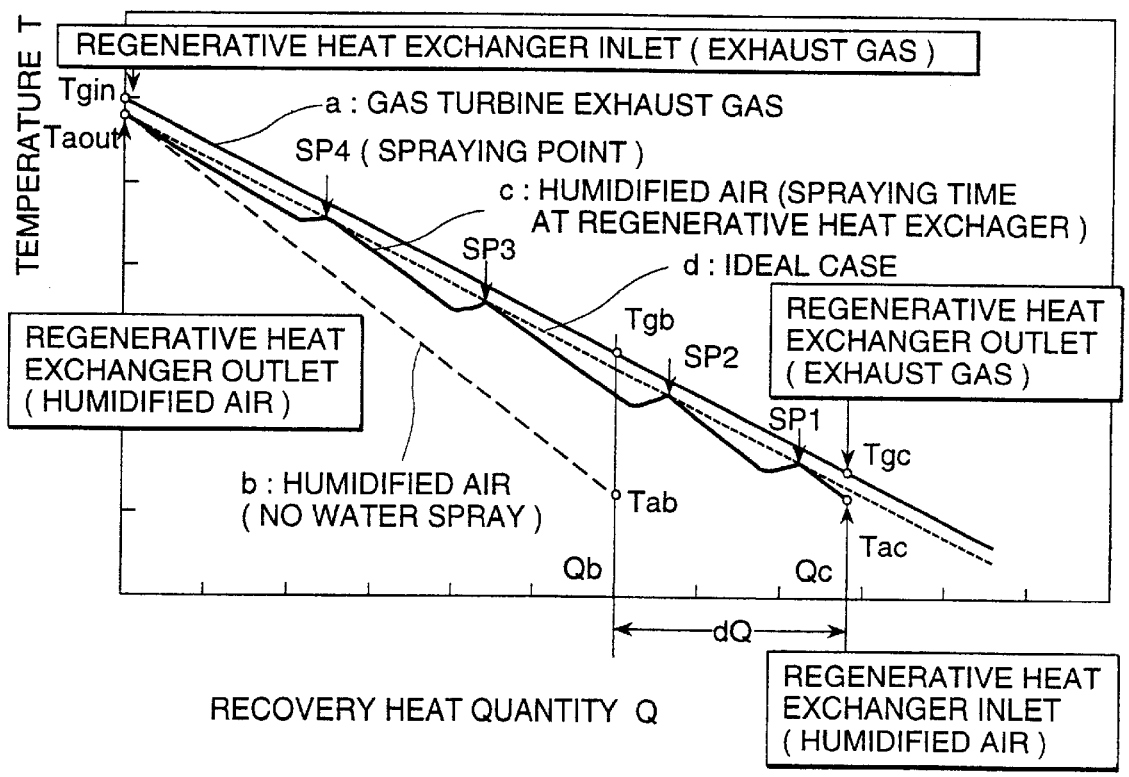
FIG. 4 is a diagram for explanation of arrangement of spray nozzles of the regenerative heat exchanger in FIG. 1.

Further, FIG. 4 shows an example of arrangement of the spray nozzles 4 in the regenerative heat exchanger 3 of the gas turbine power plant according to the present invention.

In FIG. 4, an ordinate is temperature condition of exhaust gas C inside the regenerative heat exchanger 3 or temperature condition of humidified air A1 (at arbitrary scale), and an abscissa is recovery heat quantities (at arbitrary scale) recovered from the exhaust gas C.

In FIG. 4, a straight line a is temperature conditions of exhaust gas C in which it enters the inlet of the regenerative heat exchanger 3 at a temperature Tgin and the temperature lowers as the recovery heat quantity Q by the humidified air A1 is increasing. A broken line d is a straight line parallel to the line a, showing temperature condition of a medium to be heated in the case where ideal heat recovery from the exhaust gas C can be achieved.

A straight line b is temperature conditions of the humidified air A1 when water spray is not effected by the spray nozzle 4. The humidified air A1 enters the inlet of the regenerative heat exchanger 3 at a temperature Tab (=Tac), recovers heat from the exhaust gas C and is taken out at the temperature Taout from the outlet of the regenerative heat exchanger 3 at the temperature Taout. At this time, a flow rate of the humidified air A1 is less and the specific heat is also smaller than those of the exhaust gas C, so that an inclination is larger than that of the straight line a and heat recovery quantity Qb corresponding to a position at the inlet temperature Tab is only Qb. Further, the temperature at the outlet of the regenerative heat exchanger 3 becomes high and Tgb.

On the other hand, a bent line c is a temperature condition of humidified air A1 under which water spray is effected inside the regenerative heat exchanger according to the present invention, and in this case the water spray is effected at 4 positions (spray points SP1, SP2, SP3 and SP4) inside the regenerative heat exchanger 3. The humidified air A1 enter the inlet of the regenerative heat exchanger 3 at a temperature of Tac (Tab), effects heat recovery from the exhaust gas C and goes out from the outlet of the regenerative heat exchanger 3 at a temperature of Taout. In this case, the humidified air entered the inlet of the regenerative heat exchanger 3 at a temperature of Tac (Tab) is raised in temperature in parallel to the straight line b by the heat recovery from the exhaust gas C, however, the water is sprayed at the spray point SP1, and the temperature of the humidified air A1 is lowered by mainly evaporation latent heat and the flow rate thereof increases. The humidified air A1 is raised in temperature by heat recovery from the exhaust gas C, however, in a similar manner to the above, it is water-sprayed at the spray points SP2, SP3 and SP4 and the temperature of the humidified air A1 raised in temperature is lowered and a flow rate thereof increases. Thereby, an average inclination of the bent line c approaches to the ideal straight line d, and a heat recovery quantity corresponding to the inlet temperature Tac increases to Qc. Further, the temperature of the exhaust gas at the outlet of the regenerative heat exchanger 3 becomes low and Tgc.

That is, the water spray in the regenerative heat exchanger 3 can increase a recovery heat quantity by dQ (=Qc−Qb), and improve the plant efficiency and plant output, as explained in FIG. 2.

Further, if the number of spray points is increased, it approaches more to the ideal straight line d, and it is possible to further increase a recovery heat quantity.

According to the present embodiment, the following effects can be attained.

(1) By spraying fine water droplets at a downstream side of the compressor 1 and inside the regenerative heat exchanger 3 and heating feedwater to be supplied to the spray device 2 and the spray nozzle 4 by the feedwater heater 9 when necessary, it is possible to effectively effect heat recovery from the exhaust gas C and increase a flow rate of the working medium for the turbine 7, so that it has an effect that the plant efficiency and plant output can be improved.

(2) Further, by spraying fine water droplets at the downstream side of the compressor 1 and inside the regenerative heat exchanger 3, an intercooler of the compressor 1 and an aftercooler at the downstream side of the compressor 1 and further a saturator become unnecessary. Thereby, it is possible to reduce a pressure loss of the working medium of the turbine 7, and the effects that the plant efficiency and plant output are increased are attained. In the conventional saturator unit as disclosed in JP A 9-264158, since compressed air and falling water droplets are directly counter-contacted with each other, a pressure loss is large (for example, 0.3 ata). Further, by using a spray device instead of the saturator unit, such effects are performed that the plant is simplified and small-sized, and the responsivity of control of the plant is improved.

(3) Further, by recirculating water using, as feedwater for the fine water droplet spray, the recovery water which is recovered by condensing water in the exhaust gas C before being discharged into the atmosphere, new make-up water from the outside is almost not needed and a quantity of water discharged to the atmosphere can be minimized, so that it has an effect that an influence thereof to circumstances is small.

(4) Further, by controlling spray quantities of fine water droplets to be sprayed onto the humidified air A1 and humidified air B according to operational conditions of the turbine, even if the operational conditions (load, etc.) of the turbine change, it has an effect that a high thermal efficiency can be maintained.

Another(second) embodiment will be described, referring to FIG. 5.

Figure 5:
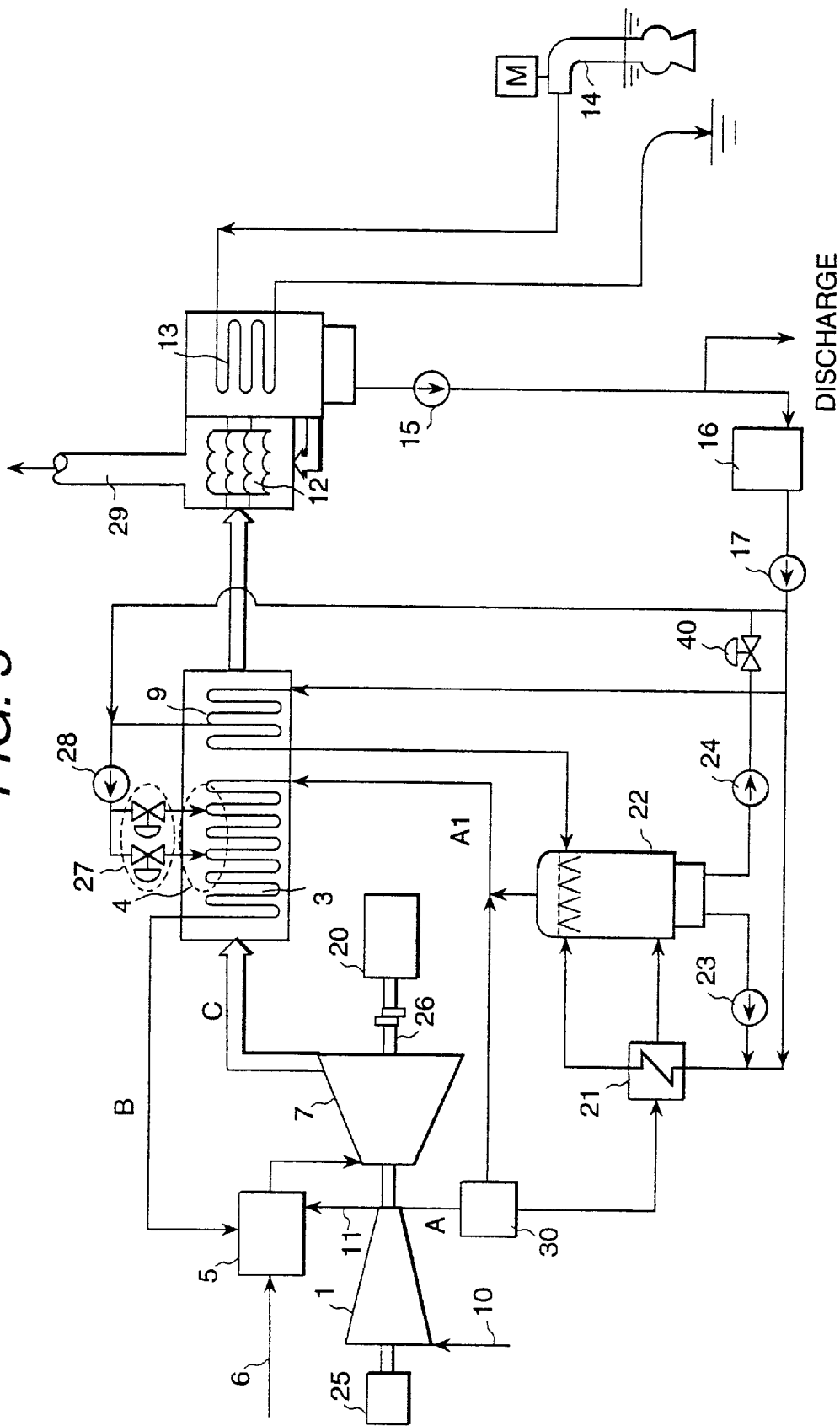
FIG. 5 is a schematic diagram of a mechanical system showing a gas turbine power plant of a second embodiment of the present invention.

In FIG. 5 showing a mechanical system of the gas turbine power plant of the second embodiment, 21 denotes an air cooler for cooling compressed air, 22 denotes a saturator unit for humidifying the compressed air, 23 and 24 each denote a recirculation pump for pressurizing liquid phase water in the saturator unit and 40 denotes a control valve for controlling a flow rate of feedwater.

The second embodiment shown in FIG. 5 has an air cooler 21 and a saturator unit 22 arranged on the flow line of compressed air A between the compressor 1 and the regenerative heat exchanger 3. The compressed air A is introduced into the saturator unit 22 after being cooled by the air cooler 21 and is directly counter-flow-contacted with liquid phase water heated by the air cooler 21 and the feedwater heater 9 to evaporate a part of the water and transfer it to the compressed air A, whereby humidified air A1 of relatively low temperature is attained and the liquid phase water is lowered in temperature. The liquid phase water lowered in temperature is taken out from the saturator unit 22 by the recirculation pumps 23 and 24 and returned to the saturator unit 22 after being heated by the cooler 21 and the feedwater heater 9. In the second embodiment, it is preferable to be "a feedwater temperature to the saturator unit 22">"a feedwater temperature to the spray nozzle 4".

Alteratively, the feedwater pressurized by the recirculation pump 24 can be supplied to the spray nozzle 4, bypassing the feedwater heater 9. That is, the high temperature feedwater heated by the feedwater heater 9 and the low temperature feedwater bypassed the feedwater heater 9 are joined to be supplied to the spray nozzle 4. And, the temperature of feedwater to be supplied to the spray nozzle 4 is controlled by controlling a flow rate of the feedwater bypassing the feedwater heater 9 by the control valve 40 arranged on the bypass line and controlling a flow distribution of the high temperature feedwater heated by the feedwater heater 9 and the low temperature feedwater bypassed the feedwater heater 9. Thereby, when a plant load changes, there is an effect that it is possible to effect such a control that reduction of thermal heat recovery efficiency is suppressed.

On the other hand, the humidified air A1 obtained in the saturator unit 22 is introduced into the regenerative heat exchanger 3 arranged in the flow line for exhaust gas C to recover heat from the exhaust gas C as in the first embodiment shown in FIG. 1, and turned humidified air B by spraying fine water droplets on the humidified air A1 by the spray nozzle 4 arranged at least one position inside the regenerative heat exchanger 3. The humidified air B is used as combustion support gas in the combustor and as a working medium of the gas turbine 7, etc.

According to the second embodiment, as in the first embodiment, a spray quantity of fine water droplets of the nozzle 4 is controlled by the control valve 27, on the basis of the temperature, pressure of the humidified air B at the inlet of the combustor 5, or a temperature difference between exhaust gas in the flow line part for exhaust gas C along the regenerative heat exchanger 3 and humidified air B or both thereof, taken as a control indication, whereby an effect that responsivity of the control can be improved irrespective of provision of the saturator unit 22 of high heat capacity is attained, in addition to heat recovery of high efficiency according to plant operational conditions such as partial load, load change, atmospheric temperature, etc. That is, by positively using the spray nozzle 4 it is possible to improve the responsivity of the control of the plant.

Further, according to the second embodiment, by spraying fine water droplets by the spray nozzle 4 it is possible to make a heat recovery quantity from the exhaust gas C larger as compared with a conventional technique not provided with the spray nozzle 4, so that the feedwater heater 9 and the saturator unit 22 can be small-sized, whereby a site area for the whole plant can be made small and the responsivity can be improved.

Further, since it is provided with a saturator unit of relative large heat capacity having a water recirculation line, supply of liquid phase water to the saturator unit 22 is not stopped instantly because of the inertia of recirculation water even if any trouble takes place in the water recirculation system, the flow rate and temperature of the humidified air A1 do not change rapidly, and there is an effect that it is small to impart thermal shock to an equipment such as a turbine system, an exhaust gas recovery system, etc.

Further another (third) embodiment will be described, referring to FIG. 6.

Figure 6:
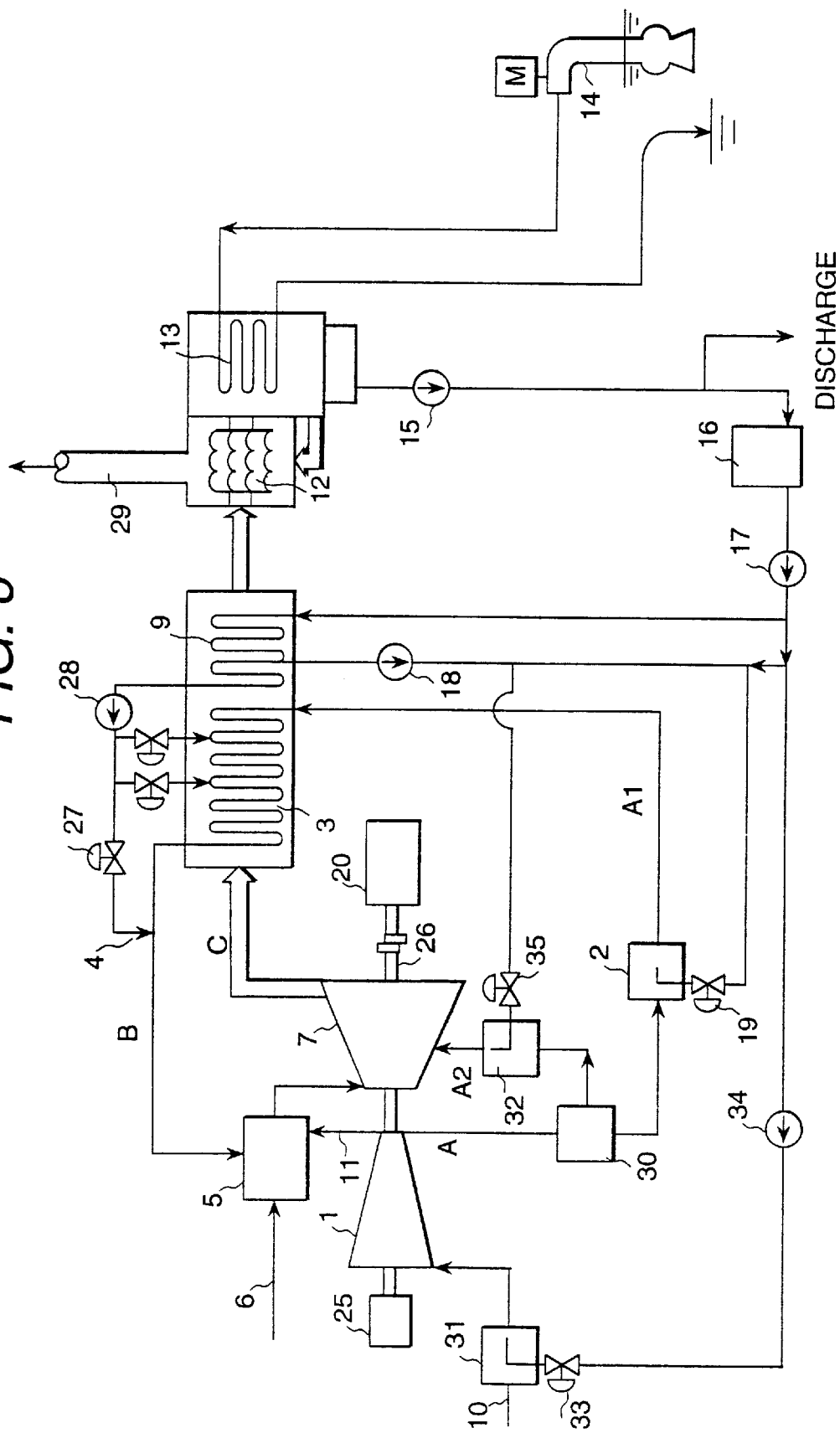
FIG. 6 is a schematic diagram of a mechanical system showing a gas turbine power plant of a third embodiment of the present invention.

In FIG. 6 showing a mechanical system of a gas turbine plant of the third embodiment, A2 denotes humidified air, 31 denotes a spray device (suction air cooler) injecting or spraying water or steam onto air before compression, 32 denotes a spray device injecting or spraying water or steam onto compressed air A, 33 denotes a control valve controlling a flow rate of feedwater, 34 denotes a feedwater pump pressurizing feedwater and 35 denotes a control valve controlling a flow rate of feedwater.

In the third embodiment shown in FIG. 6, the spray device 31 is provided at an inlet of the compressor 1, in addition to the construction of the first embodiment. The spray device 31 sprays fine water droplets on air 10 or the like. As feedwater for fine water droplet spraying, the recovery water recovered by the water recovery unit 13 is used without heating. With this construction, a part of the fine water droplets sprayed by the spray device 31 evaporates to thereby lower the temperature of air at the suction side of the compressor 1, and remaining of the fine water droplets evaporates inside the compressor 1 to lower a temperature of the air, so that power of the compressor 1 can be reduced, the thermal efficiency of the plant can be improved. Further, in order to cool the air 10 before compression, it is possible to arrange a heat exchanger of counter-flow and indirect heat-exchange type at the inlet of the compressor 1 and effect indirect heat exchanging between an arbitrary cooling medium and the air 10 thereby to cool the air 10.

Further, in the third embodiment, a part or all of the compressed air A from the compressor 1 is branched by the branch device 30 and introduced into the spray device. In the spray deice 32, water of low temperature recovered by the water recovery unit 13 is made in fine droplet condition and sprayed into the compressed air A to obtain humidified air A2 of relatively low temperature. The humidified air A2 is supplied to the inside of the turbine blades or/and the turbine rotor 26 to cool the turbine blades or/and turbine rotor 26. A spray quantity of fine water droplets by the spray device 32, that is, a flow rate of feedwater to the spray device 32 is controlled by the control valve 35 on the basis of a plant load, a flow rate of fuel 6 or the temperature of combustion gas produced in the combustor 5, taken as a control indication so that it becomes the temperature of humidified air A2 corresponding to the temperature of working medium of the gas turbine 7. Thereby, even when the temperature of the working medium of the turbine 7 is high (for example, about 1400° C. or higher), it has an effect that the moving blades and turbine rotor 26, etc. are prevented from suffering from thermal damage. That is, in the case where the working medium of the turbine 7 contains a lot of steam of large specific heat as in the gas turbine power plant according to the present invention, heat drop accompanied by expansion of the working medium becomes small, so that temperatures of the moving blades of the turbine 7, the turbine rotor 26, etc. rise. In this third embodiment, as a cooling medium for cooling the moving blades of the turbine 7 and turbine rotor 26, etc., not dry air but humidified air A2 is used, whereby it is possible to suppress the temperature elevation, and it is also possible to improve thermal efficiency of the plant without lowering the temperature of the working medium at the inlet portion of the turbine 7.

Further, in the third embodiment, the spray device 4 is arranged on the flow line for humidified air B between the regenerative heat exchanger 3 and the combustor 5, and fine droplets are sprayed onto the humidified air B from the regenerative heat exchanger 3, whereby a moisture content of the humidified air B is made more and a flow rate of working medium of the turbine is increased, thereby to improve output of the plant.

Figure 7:
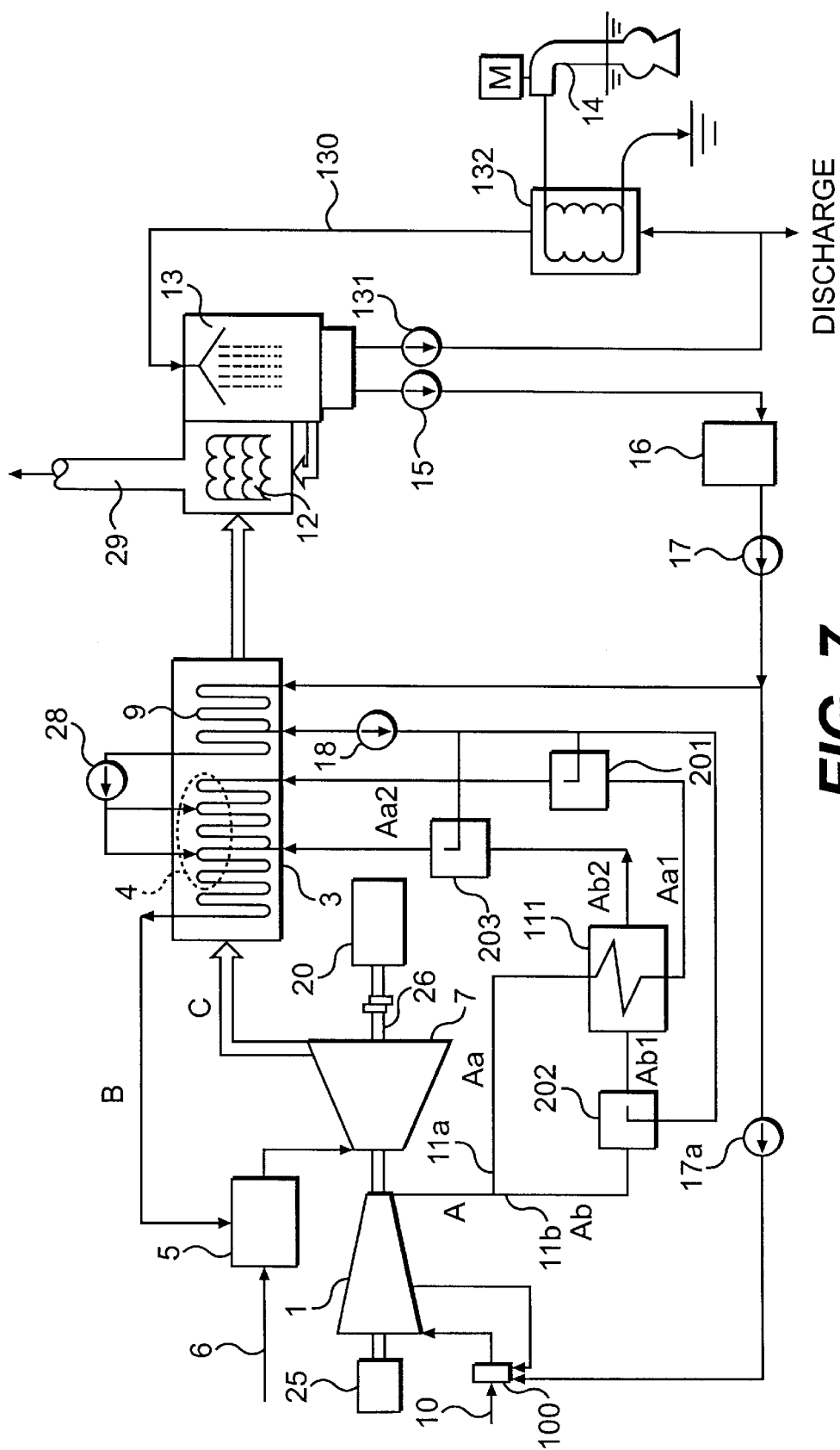
FIG. 7 is a schematic diagram of a mechanical system showing a gas turbine power plant of a fourth embodiment of the present invention.

Still further another (fourth) embodiment will be described hereunder in detail, referring to FIGS. 7 and 8.

A gas turbine power plant of this embodiment comprises a compressor 1 for compressing air to discharge compressed air A, a combustor 5 for burning fuel 6 with humidified compressed air B to produce combustion gas, a turbine 7 driven by the combustion gas from the combustor 5 and driving the compressor 1 mechanically connected thereto by a rotor shaft 26, a generator 20 connected to the turbine 7 by the rotor shaft 26 and driven by the turbine 7 to generate electric power, a regenerative heat exchanger 3 for heating compressed air A to be supplied to the combustor with the heat of exhaust gas C of the turbine 7, a first flow line 11a of a part Aa of compressed air A from the compressor 1, leading to the regenerative heat exchanger 3, a heat exchanger 111 arranged on the first flow line 11a for lowering temperature of the compressed air Aa in the first flow line 11a, a first spray device 201 arranged on the first flow line 11a downstream of the heat exchanger 111 and upstream of the regenerative heat exchanger 3, a second flow line 11b of another part Ab of compressed air 11 from the compressor 1, fluidly communicating with the heat exchanger 111, and a second spray device 202 arranged on the second flow line 11b for spraying water onto the compressed air flowing in the second flow line 11b and humidifying the compressed air Ab to turn it to humidified air Ab1 lowered in temperature, in which the humidified air Ab1 is heat-exchanged with the compressed air Aa from the first flow line 11a in the heat exchanger 111.

The regenerative heat exchanger is provided with a water spray 4 arranged therein for spraying water droplets onto the compressed air therein, and the water spray 4 is composed of a plurality of spray nozzles arranged along an air flow pipe of the regenerative heat exchanger 3. The compressed air Aa2 humidified and lowered in temperature by the first spray device 201 enters the regenerative heat exchanger 3 and is heated by exhaust gas C of the turbine 7 while being supplied with sprayed water from the water spray 4.

The gas turbine power plant is provided with a third spray device 203 on the second flow line 1ib downstream of the heat exchanger 111, if required. The humidified compressed air Ab2 heated by the heat exchanger 111 is humidified and cooled by the third spray device 203 to be turned humidified air lowered in temperature and led to the regenerative heat exchanger 3 to join the compressed air Aa2 upstream of the entrance of the regenerative heat exchanger 3.

Further, the gas turbine power plant is provided with a feedwater heater 9 downstream of the regenerative heat exchanger 3 with respect to a flow of exhaust gas from the turbine 7, and the above-mentioned water spray 4 and the first, second and third spray devices 201, 202, 203 each are supplied with feedwater heated by the feedwater heater 9, with a flow rate controlled by control valves not shown.

The feedwater is supplied from a water recovery unit 13 in which the exhaust gas cooled by the regenerative heat exchanger 3 and the feedwater heater 9 is cooled with cooled recirculation water, and steam in the exhaust gas is condensed to become condensate. The condensate is fed to the feedwater heater 9 by a condensate pump 15 and feedwater pump 17 through a water treatment apparatus such as a demineralizer 16. The exhaust gas cooled in the water recovery unit 13 is heated by the exhaust gas from the feedwater heater 9 at the gas/gas heat exchanger 12 and then exhausted into the atmosphere through a stack 29.

The recirculation water is recirculated in a line 130 by a recirculation pump 131 and cooled by a cooler 132 with sea water supplied by a sea water pump 14.

With the construction as mentioned above, the compressed air A of high temperature is divided into two, compressed air Aa and compressed air Ab at an outlet of the compressor 1. The compressed air Ab is lowered in temperature sensible heat and heat of evaporation of water sprayed by the spray device 202 and humidified to be humidified compressed air Ab1 of low temperature. The humidified compressed air Ab1 and the compressed air Aa of high temperature are heat-exchanged in the heat exchanger 111, the humidified compressed air Ab1 becomes humidified compressed air Ab2 of relatively high temperature and is supplied into the regenerative heat exchanger 3 at middle stage. When necessary, the humidified compressed air Ab2 can be humidified and lowered in temperature by spraying water by the spray device 203 before entering the regenerative heat exchanger 3.

The compressed air Aa after the heat exchanging with the humidified compressed air Ab1 becomes compressed air Aa1 of relatively low temperature. The compressed air Aa1 is further lowered in temperature by sensible heat and evaporation heat of water sprayed by the spray device 201 to become humidified compressed air Aa2 of low temperature and introduced into the regenerative heat exchanger 3 at the inlet.

That is, in the first embodiment, compressed air of high temperature at the outlet of the compressor 1 is humidified and lowered in temperature by directly spraying water, so that the temperature of the compressed air humidified and lowered in temperature is about 130° C. On the contrary, in the fourth embodiment, one of the divided compressed air Aa and Ab is lowered in temperature through heat exchange with the other part of the compressed air and then humidified and lowered in temperature, so that the temperature of humidified compressed air Aa2 can be lowered to about 100° C. or less under the same compressor outlet air condition as in the first embodiment. By introducing the humidified compressed air Aa2 of low temperature into the regenerative heat exchanger 3, heat can be recovered from the gas turbine exhaust gas C until the temperature of the exhaust gas C becomes sufficiently low, whereby the efficiency of the power plant can be raised.

Figure 8:
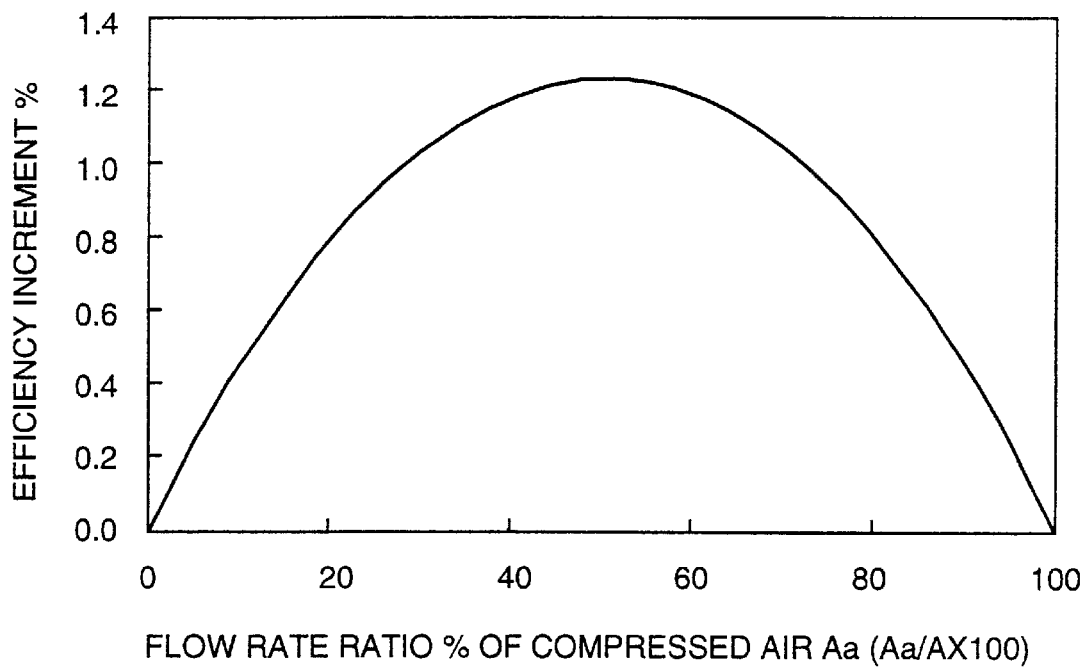
FIG. 8 is a graph showing a relation between the plant efficiency increments % (relative value) and flow rate ratios of compressed air Aa to total compressed air from the compressor (Aa/A(=Aa+Ab))

In FIG. 8, an abscissa is percentages of a flow rate of the divided compressed air Aa to a flow rate of the total compressed air at the compressor outlet, and an ordinate is relative values of increment in power generation efficiency of the plant to the efficiency when a ratio of flow rate of compressed air Aa is 0. When a ratio of flow rate of the compressed air Aa is 0, the value corresponds to that in the first embodiment.

As is apparent from FIG. 8, an increment in the power generation efficiency of the plant increases according to increase in ratio of flow rate of the compressed air Aa, and it becomes maximum about 50% of the flow rate ratio of the compressed air Aa. However, further increase of the ratio of flow rate of the compressed air Aa decreases increment in the power generation efficiency. It is preferable for the ratio of flow rate of the compressed air Aa to be about 50% in order to raise the plant power generation efficiency.

Referring back to FIG. 7, the power plant is provided with an atomizer 100 or spray device for atomizing feedwater with compressed air extracted from the compressor. The air to be introduced into the compressor 1 is humidified by atomized water from the atomizer 100. The feedwater for the atomizer 100 is used feedwater not heated by the feed water heater 9 and pressurized by a feedwater pump 17a. The provision of the atomizer 100 enable the air 10 to be humidified, whereby air being compressed in the compressor is suppressed a little to rise in temperature.

According to the present embodiment, plant performance, that is, plant power generation efficiency can be greatly improved, which will be explained hereunder in comparison with a relevant prior art, for example, ASME Paper 95-CTP-39 "Humid Air Cycle Development Based on Exergy Analysis and Composite Curve Theory" described in the background of the invention.

In the comparison, a low temperature region heat recovery ability was studied. The low temperature region heat recovery ability is as defined later.

Figure 9:
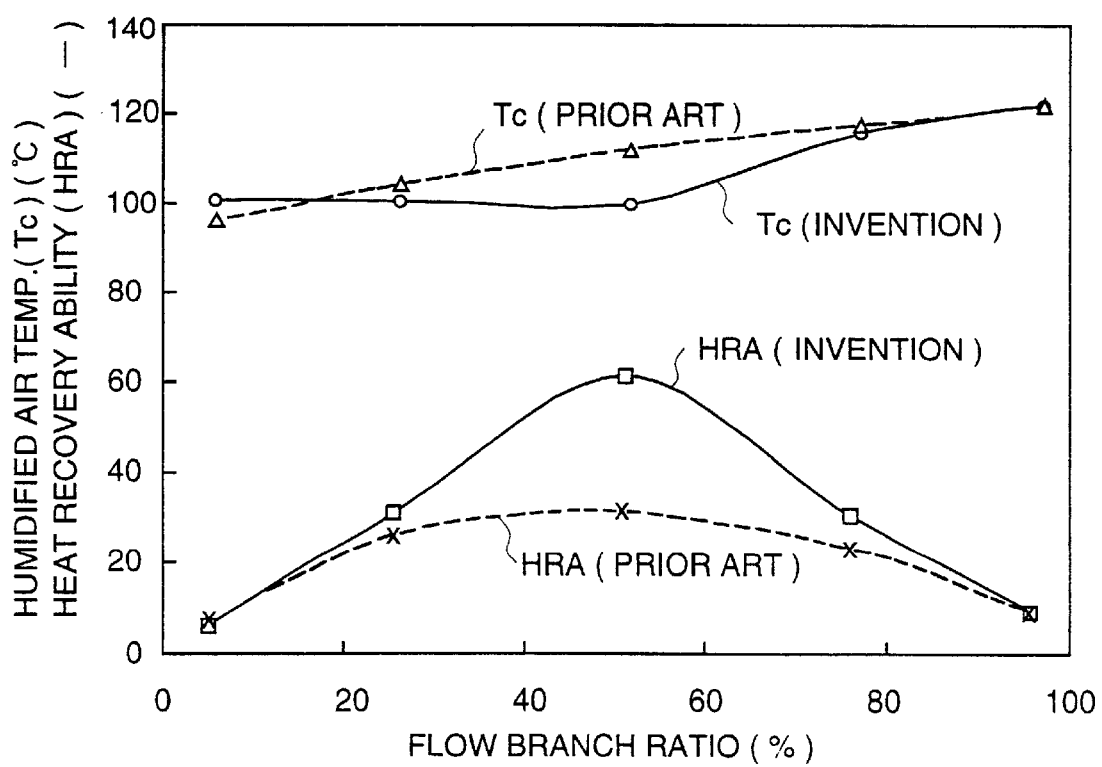
FIG. 9 is graphs of humidifying and temperature lowering characteristics for explaining plant efficiency in comparison with the present invention and a prior art.

Humidifying and temperature-reducing characteristics of compressor outlet compressed air, such as low temperature side humidified air temperature, low temperature region heat recovery ability are illustrated in FIG. 9. In FIG. 9, an abscissa shows flow branch ratios (%) and an ordinate shows temperatures (°C.) of low temperature humidified air and low temperature region heat recovery ability (relative value), obtained by the systems of the present embodiment and the prior art.

The flow branch ratios are a ratio of flow rate of compressed air Aa and Ab in the present embodiment, and in the prior art a ratio of flow rate of a part of compressed air cooled by the aftercooler, directed to the heat recovery unit by turbine exhaust gas and a flow rate of the other part being humidified and cooling the compressed air in the aftercooler. The characteristic curves Tc are low temperature side humidified air temperatures of the present embodiment and the prior art, respectively, and the characteristic curves HRA are low temperature region heat recovery abilities of the present invention and the prior art, respectively.

An object of obtaining the low temperature humidified air is to enable recovering heat from the gas turbine exhaust until the exhaust gas temperature becomes as low as possible, and a system is desirable in which air of low temperature can be obtained as much as possible. Therefore, in order to compare the heat recovery abilities of the prior art system and the present embodiment in a region where gas turbine temperature is relatively low, here, the low temperature heat recovery ability is defined as follows:

> Low temperature side heat recovery ability=a ratio of a flow rate of compressed air flowing to the low temperature humidified air side (branch ratio)×(gas turbine exhaust gas temperature around the outlet of the regenerative heat exchanger–low temperature side humidified air temperature)×coefficient C.

where the gas turbine exhaust gas temperature around the regenerative heat exchanger is set 125° C. Further, the coefficient C is for adjusting the scale when illustrated, and here the coefficient is set C=1/20.

In the prior art system as shown in FIG. 9, the low temperature region heat recovery ability defined as above becomes maximum at a flow branch ratio of about 50%. However, since the low temperature side humidified air temperature rises as the flow branch ratio increases, an increment in low temperature region heat recovery ability is relatively small.

On the other hand, in the present embodiment, also, the low temperature region heat recovery ability as defined above becomes maximum at a flow branch ratio of about 50%. The low temperature side humidified air temperature in the present embodiment is constant and about 100° C. until the flow branch ratio reaches about 50%. Further, the low temperature side humidified air temperature can be made lower than in the prior art at a flow branch ratio of about 50%. Therefore, the low temperature region heat recovery ability can be made larger than the prior art.

The reason why the low temperature side humidified air temperature in the present embodiment can be made lower at a flow branch ratio of about 50% than in the prior art will be explained under the same condition as above.

In the prior art system, all the quantity of compressed air (about 300° C.) at the compressor outlet is heat-exchanged with 50% (about 113° C.) of the compressed air humidified and lowered in temperature to get compressed air lowered in temperature. At this time, a flow rate of the compressed air that is to heat at the time of heat exchanging is about twice as much as a flow rate of the compressed air that is to be heated, the temperature of the compressed air lowered in temperature is reduced to about 210° C. at most, considering temperature efficiency of the heat exchanger. Therefore, the temperature of the compressed air that the compressed air of about 210° C. is humidified and lowered in temperature is about 113° C. at most.

On the contrary, in the present embodiment, the compressed air at the compressor outlet is divided into two flows the flow rates of which are 1:1. By humidifying one of the divided compressed air flow, the temperature of the compressed air can be reduced to about 125° C. The other divided compressed air flow (about 300° C.) is heat-exchanged with the divided compressed air (about 125° C.) humidified and lowered in temperature, thereby the compressed air cooled to about 140° C. The compressed air lowered to about 140° C. is small in water content which is the same as the compressed air at the compressor outlet. Therefore, it is possible to lower the temperature of the compressed to about 100° C. by humidifying it before entering the regenerative heat exchanger.

According to the present embodiment, the heat recovery ability in the low temperature region can be made larger than that in the prior art, so that heat can be recovered from the gas turbine exhaust gas until a temperature thereof reaches a low temperature, whereby the plant power generation efficiency can be raised. Further, in the case where the temperature at the outlet of the regenerative heat exchanger is set a relatively high temperature, a temperature difference between the exhaust gas at the outlet of the regenerative heat exchanger and the compressed air entered there becomes relatively large, so that it has an effect that the heat conductive area of the regenerative heat exchanger can be made small.

What is claimed is:

1. A gas turbine power plant having no intercooler for compressed air and comprising:
   a compressor for compressing air;
   a combustor for burning fuel with compressed air from said compressor to produce combustion gas;
   a turbine driven by the combustion gas;
   a generator driven by said turbine to produce electric power;
   a regenerative heat exchanger, heating the compressed air with the heat of exhaust gas of said turbine and having a water spray arranged therein for spraying water droplets onto the compressed air therein;
   a spray device directly communicating with said compressor for spraying water onto compressed air of high temperature from said compressor to humidify the compressed air, the compressed air being led to said regenerative heat exchanger; and
   a further spray device for spraying water on to air to be sucked into said compressor.

2. A gas turbine power plant comprising:
   a compressor for compressing air and discharging the compressed air;
   a combustor for burning fuel with the compressed air from said compressor to produce combustion gas;
   a turbine driven by the combustion gas produced by said combustor;

a generator driven by said turbine to generate electric power;

a regenerative heat exchanger for heating compressed air to be supplied to said combustor, using the heat of exhaust gas exhausted from said turbine, said regenerative heat exchanger having a water spray arranged therein for spraying water onto the compressed air therein;

a first flow line for a part of the compressed air from said compressor, leading to said regenerative heat exchanger;

a heat exchanger arranged on said first flow line for lowering temperature of the compressed air in said first flow line;

a first spray device arranged on said first flow line downstream of said heat exchanger and upstream of said regenerative heat exchanger;

a second flow line for another part of the compressed air from the compressor, fluidly communicating with said heat exchanger;

a second spray device arranged on said second flow line for spraying water onto the compressed air flowing in said second flow line and humidifying the compressed air to turn it to humidified air lowered in the temperature, the humidified air being heat-exchanged with the compressed air from said first flow line in said heat exchanger; and a device for spraying water on to air to be sucked into said compressor.

3. A gas turbine power plant according to claim 2, wherein said device for spraying water on to air to be sucked into said compressor is an atomizer for atomizing water.

* * * * *